(12) United States Patent
Carlson et al.

(10) Patent No.: US 10,306,832 B2
(45) Date of Patent: Jun. 4, 2019

(54) BLADE PIN AND ASSOCIATED CUTTING ELEMENT

(71) Applicant: Blount, Inc., Portland, OR (US)

(72) Inventors: Jason Carlson, Bryon, IL (US); Kurt Summers, Oregon, IL (US); Robert A. Dewey, Dixon, IL (US)

(73) Assignee: Blount, Inc., Portland, OR (US)

( * ) Notice: Subject to any disclaimer, the term of this patent is extended or adjusted under 35 U.S.C. 154(b) by 175 days.

(21) Appl. No.: 15/660,795

(22) Filed: Jul. 26, 2017

(65) Prior Publication Data

US 2019/0029171 A1 Jan. 31, 2019

(51) Int. Cl.
| | |
|---|---|
| *A01D 34/73* | (2006.01) |
| *B26D 1/29* | (2006.01) |
| *B26D 7/26* | (2006.01) |
| *B23Q 11/12* | (2006.01) |
| *F16B 19/00* | (2006.01) |
| *F16N 21/00* | (2006.01) |
| *A01D 34/64* | (2006.01) |
| *A01D 101/00* | (2006.01) |

(52) U.S. Cl.
CPC ......... *A01D 34/733* (2013.01); *A01D 34/736* (2013.01); *B23Q 11/121* (2013.01); *B26D 1/29* (2013.01); *B26D 7/2614* (2013.01); *F16B 19/00* (2013.01); *F16N 21/00* (2013.01); *A01D 34/64* (2013.01); *A01D 2101/00* (2013.01)

(58) Field of Classification Search
CPC .... A01D 34/733; A01D 34/736; A01D 34/64; A01D 34/66; B26D 1/29; B26D 7/2614; B23Q 11/121; F16B 19/00; F16N 21/00

USPC ............... 56/6, 255, 295, 12.7, 13.6; 30/276
See application file for complete search history.

(56) References Cited

U.S. PATENT DOCUMENTS

| | | | |
|---|---|---|---|
| 1,673,459 A | | 6/1928 | Jurad |
| 2,069,843 A | | 2/1937 | Pecker et al. |
| 2,889,677 A | | 6/1959 | Wood |
| 2,916,867 A | | 12/1959 | Chadwick |
| 3,918,241 A | * | 11/1975 | Stillions ............... A01D 34/733 56/12.7 |
| 4,336,953 A | * | 6/1982 | Low .................... B66F 9/07568 180/435 |
| 4,347,915 A | | 9/1982 | Cooper |

(Continued)

FOREIGN PATENT DOCUMENTS

| | | |
|---|---|---|
| EP | 1228680 A2 | 8/2002 |
| EP | 2939516 A1 | 11/2015 |

*Primary Examiner* — Robert E Pezzuto
(74) *Attorney, Agent, or Firm* — Schwabe Williamson & Wyatt, P.C.

(57) ABSTRACT

Apparatuses associated with cutting elements are disclosed herein. In embodiments, a blade pin may include a head and a main body. The main body may extend from the head of the blade pin, and may include a cavity. The main body may further include a first aperture, wherein the first aperture is connected to the cavity. The main body may further include a second aperture formed in a sidewall, wherein the sidewall extends from the first end to the second end of the main body, and wherein the second aperture is connected to the cavity. The blade pin may include a valve, wherein the valve allows passage of a lubricant into the cavity through the first aperture and prevents passage of the lubricant out of the cavity through the first aperture. Other embodiments may be described and/or claimed.

11 Claims, 15 Drawing Sheets

(56) References Cited

U.S. PATENT DOCUMENTS

| | | | |
|---|---|---|---|
| 5,119,707 A | | 6/1992 | Fischer |
| 5,622,035 A | * | 4/1997 | Kondo ................. A01D 34/733 30/276 |
| 5,640,836 A | * | 6/1997 | Lingerfelt ............ A01D 34/736 30/276 |
| 5,845,468 A | * | 12/1998 | Richardson .......... A01D 34/733 56/6 |
| 6,055,798 A | | 5/2000 | Fulmer et al. |
| 6,305,153 B1 | * | 10/2001 | Neuerburg ............ A01D 34/66 56/13.6 |
| 7,647,758 B1 | * | 1/2010 | Bandi ................. A01D 34/668 56/295 |
| 8,769,918 B2 | | 7/2014 | Williams |
| 9,481,412 B2 | | 11/2016 | Tsubaki et al. |
| 2006/0067787 A1 | | 3/2006 | Nelson et al. |
| 2007/0079512 A1 | | 4/2007 | Nelson et al. |
| 2010/0115905 A1 | | 5/2010 | Labar |
| 2010/0270108 A1 | | 10/2010 | Brunner |
| 2013/0206512 A1 | | 8/2013 | Webb et al. |
| 2014/0123614 A1 | | 5/2014 | Hofmeister |
| 2016/0242355 A1 | | 8/2016 | Talaski |

\* cited by examiner

BLADE PIN AND ASSOCIATED CUTTING ELEMENT

TECHNICAL FIELD

The present disclosure relates to the field of cutting elements. More particularly, the present disclosure relates to means for coupling blades within a cutting element.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In cutting elements, a pin is commonly utilized for coupling a blade within a cutting element. Due to environmental factors (such as dirt, vegetation, moisture, etc.) and wear-and-tear, the pin may seize within the cutting element. When the pin seizes, it may be difficult to remove the blade from the cutting element, causing difficulties with replacing a worn blade and/or performing maintenance to the blade and/or the cutting element.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
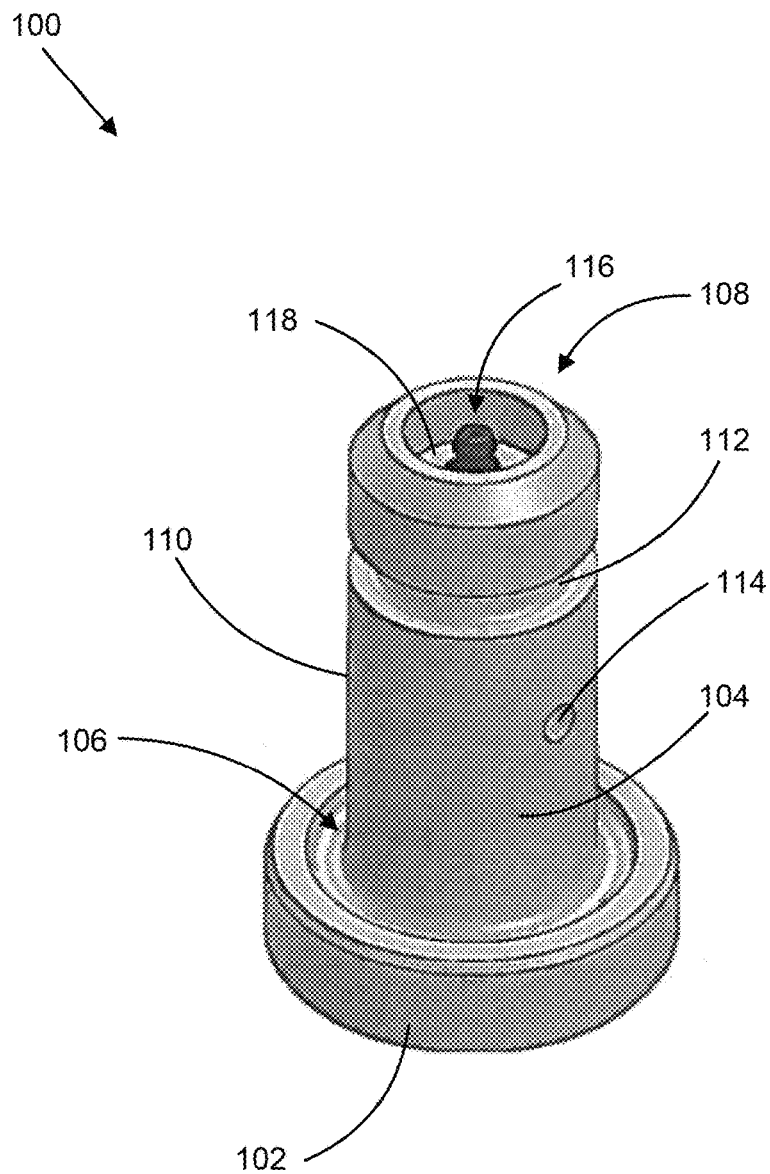
FIG. 1 illustrates an example blade pin, according to various embodiments.

Apparatuses associated with cutting elements are disclosed herein. In embodiments, a blade pin may include a head and a main body. The main body may extend from the head of the blade pin, and may include a cavity. The main body may further include a first aperture, wherein the first aperture is connected to the cavity. The main body may further include a second aperture formed in a sidewall, wherein the sidewall extends from the first end to the second end of the main body, and wherein the second aperture is connected to the cavity. The blade pin may include a valve, wherein the valve allows passage of a lubricant into the cavity through the first aperture and prevents passage of the lubricant out of the cavity through the first aperture. Other embodiments may be described and/or claimed.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

FIG. 1 illustrates an example blade pin 100, according to various embodiments. The blade pin 100 may affix a blade to a cutting element (as described further throughout this disclosure). The blade pin 100 may be formed of a rigid material, such as steel, iron, copper, silver, lead, rigid plastic, alloys thereof, or some combination thereof.

The blade pin 100 may include a head 102 and main body 104. The main body 104 may extend substantially perpendicularly (within five degrees) from the head 102 at an end of the main body 104. In other embodiments, the main body 104 may narrow as the main body 104 extends away from the head 102.

The head 102 and main body 104 may both have cylindrical profiles and may be concentric. A radius of the head 102 may be greater than a radius of the main body 104. In other embodiments, the head 102 and/or the main body 104 may have different shaped profiles, such as a polygonal profile, including, but not limited to, hexagonal, octagonal, square, and/or triangular profiles.

The main body 104 may include one or more sidewalls that extend from a first end 106 of the main body 104 to a second end 108 of the main body 104. In the illustrated example, the main body 104 may include a single sidewall 110 that has a cylindrical profile. The blade pin 100 may include one or more grooves formed in the sidewall 110 between the first end 106 and the second end 108. In the illustrated example, the blade pin 100 may include a single groove 112 formed in the sidewall 110 between the first end 106 and the second end 108. The groove 112 may be recessed into the main body 104 from the sidewall 110. The groove 112 may extend around an entirety of the circumference of the main body 104 or around some portion of the circumference of the main body 104. In other embodiments, the groove 112 may be omitted.

The main body 104 may further include one or more apertures formed in the sidewall 110. In the illustrated example, the main body 104 may include a single aperture 114. The aperture 114 may be formed in the sidewall 110 between the first end 106 and the second end 108. Further, the aperture 114 may be formed between the groove 112 and the first end 106. The aperture 114 may be connected to a cavity (not shown; see the cavity 320 (FIG. 3), the cavity 408 (FIG. 4), the cavity 508 (FIG. 5), the cavity 620 (FIG. 6), the cavity 708 (FIG. 7), the cavity 910 (FIG. 9), the cavity 1010 (FIG. 10) and the cavity 1110 (FIG. 11) for examples of embodiments of the cavity) formed within the main body 104 of the blade pin 100 (as described further throughout this disclosure). In some embodiments, the main body 104 may include the aperture 114 and a second aperture (not shown; see the third aperture 616 (FIG. 6) and/or the third aperture 724 (FIG. 7) for examples of embodiments of the second aperture) formed in the sidewall 110 opposite to the aperture 114 about the main body 104. The second aperture may also be connected to the cavity formed within the main body 104.

The main body 104 may further include a valve 116 located at the second end 108 of the blade pin 100. The valve 116 may be located at an aperture (not shown; see the first aperture 324 (FIG. 3), the first aperture 412 (FIG. 4), the first aperture 512 (FIG. 5), the first aperture 608 (FIG. 6), the first aperture 712 (FIG. 7), the first aperture 914 (FIG. 9), the first aperture 1014 (FIG. 10), and/or the first aperture 1114 (FIG. 11) for examples of embodiments of the aperture) formed in the second end 108. The aperture may be connected to the cavity formed within the main body 104. The valve 116 may be affixed within the aperture and extend through the aperture. The valve 116 may allow passage of a lubricant into the cavity through the aperture. Further, the valve 116 may prevent the passage of the lubricant out of the cavity through the aperture. In some embodiments, a liquid and/or gel lubricant (such as grease) may be passed into the cavity formed within the main body 104 via the valve 116 and be released out of the cavity at the sidewall 110 via the aperture 114.

The main body 104 may further include a recessed portion 118 located at the second end 108 of the blade pin 100. The recessed portion 118 may be recessed into the main body 104 from the second end 108. The aperture, to which the valve 116 is affixed, may be located within the recessed portion 118. A portion of the valve 116 may be located within a recess formed by the recessed portion 118, which may protect the valve 116 from damage. In other embodiments, the recessed portion 118 may be omitted.

Figure 2:
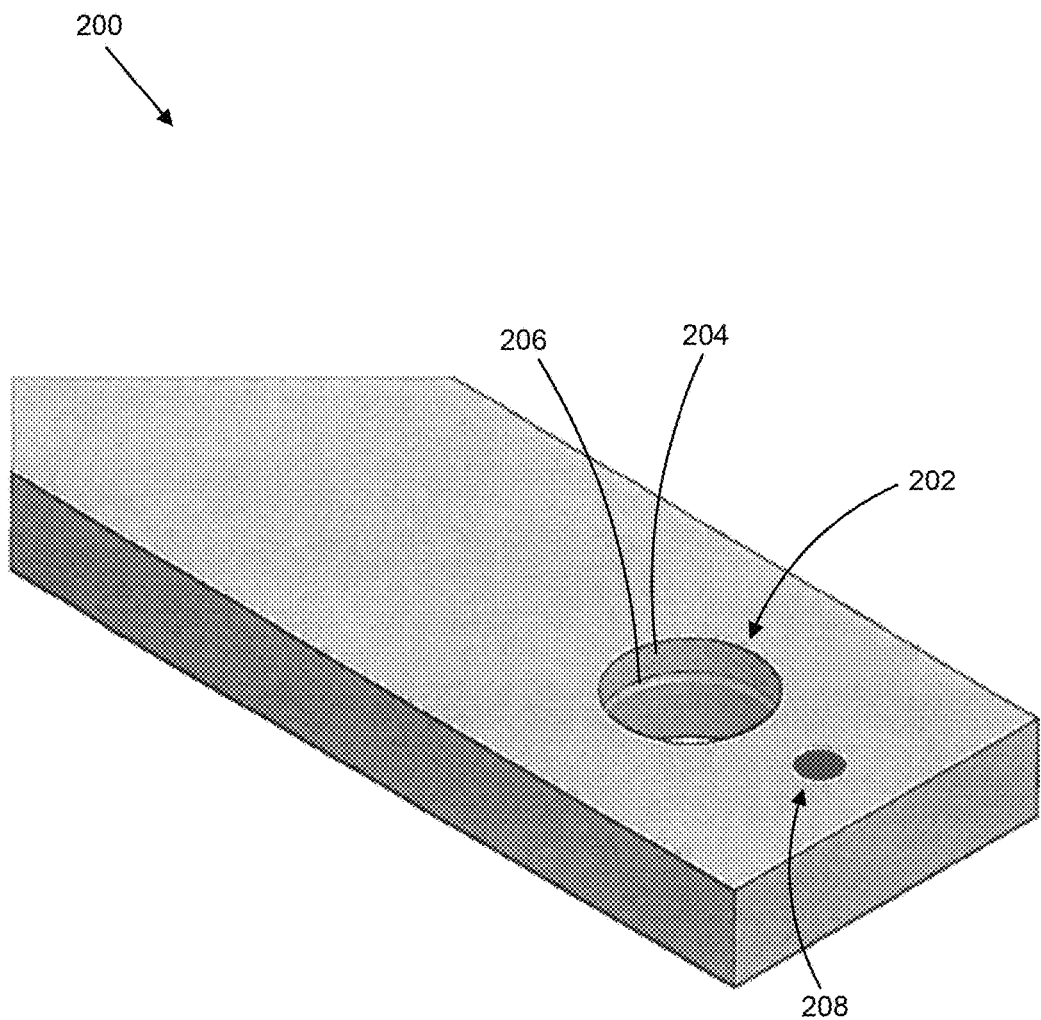
FIG. 2 illustrates an example portion of a crossbar, according to various embodiments.

FIG. 2 illustrates an example portion of a crossbar 200, according to various embodiments. The portion of the crossbar 200 illustrated may be one end of a crossbar. An entire crossbar is illustrated and described further throughout this disclosure.

The crossbar 200 may include an aperture 202 formed through the crossbar 200. The aperture 202 may extend through the crossbar 200 from a first side of the crossbar 200 to a second side of the crossbar 200, wherein the second side is located opposite to the first side. The aperture 202 may have a cylindrical profile. In other embodiments, the aperture 202 may have different shaped profiles, such as conical and/or polygonal shaped profiles. The aperture 202 may be shaped to receive the blade pin 100 (FIG. 1).

The crossbar 200 may further include an inner wall 204 that abuts the aperture 202 and extends from the first side of the crossbar 200 to the second side of the crossbar 200. The inner wall 204 may extend substantially perpendicular (within five degrees) to the first side of the crossbar 200 and/or the second side of the crossbar 200. In other embodiments, the angle of the inner wall 204 to the first side of the crossbar 200 and/or the second side of the crossbar 200 may be between zero degrees and 180 degrees to the first side of the crossbar 200.

The crossbar 200 may further include a groove 206 formed in the inner wall 204. The groove 206 may extend into the crossbar 200 from the inner wall 204. The groove 206 may extend around an entirety of a circumference of the inner wall 204 or some portion of the circumference of the inner wall 204. The groove 206 may be configured to disperse a lubricant within the aperture 202. The lubricant may prevent or reduce a likelihood that a blade pin (such as the blade pin 100 (FIG. 1)) seizes within the aperture 202 of the crossbar 200.

In some embodiments, the crossbar 200 may further include a second aperture 208. The second aperture 208 may extend from the first side of the crossbar 200 to the second side of the crossbar 200. The second aperture 208 may be shaped to receive a fastener, such as a screw, a bolt, and/or other similar fasteners. The fastener may affix and/or retain the blade pin 100 within the aperture 202. In some embodiments, the second aperture 208 may be threaded to receive and retain the fastener. In other embodiments, the second aperture 208 may be omitted.

Figure 3:
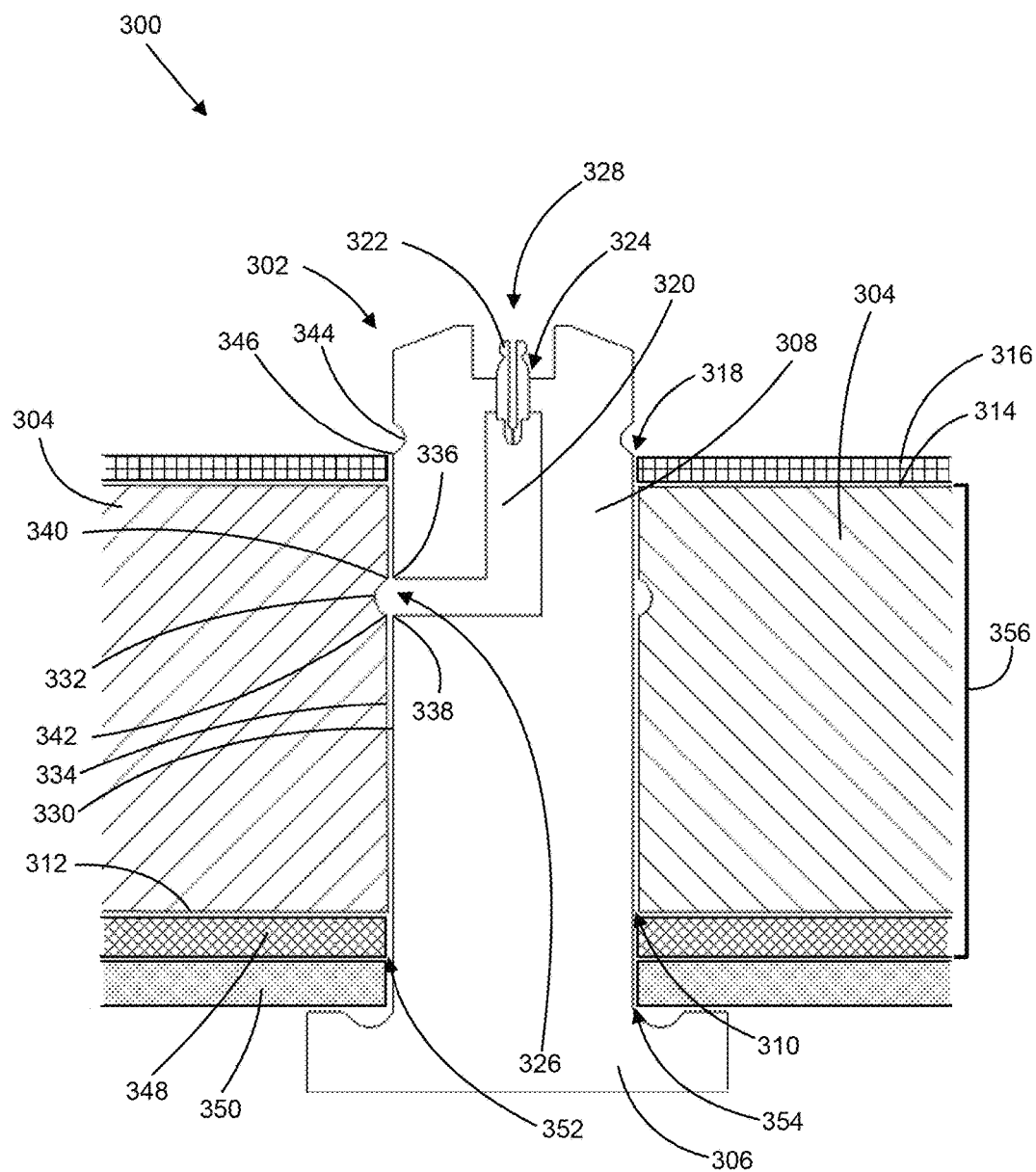
FIG. 3 illustrates a cross-sectional view of an example arrangement of a blade pin installed within a mounting element, according to various embodiments.

FIG. 3 illustrates a cross-sectional view of an example arrangement 300 of a blade pin 302 installed within a mounting element 356, according to various embodiments. The blade pin 302 may include one or more of the features of the blade pin 100 (FIG. 1).

The mounting element 356 may include a crossbar 304 and a frame 348. The frame 348 may abut a first side 312 of the crossbar 304. The crossbar 304 may include one or more of the features of the crossbar 200 (FIG. 2). The frame 348 may include a pan (such as a stump jumper pan and/or a rotary cutter blade pan). The crossbar 304 and the frame 348 may be affixed to each other. In other embodiments, the frame 348 may be affixed to the crossbar 304 via the blade pin 302. Further, in other embodiments, the crossbar 304 or the frame 348 may be omitted from the mounting element 356.

The blade pin 302 may include a head 306 and a main body 308. When the blade pin 302 is installed within the mounting element 356, the main body 308 may extend through an aperture 310 formed in the crossbar 304 and an aperture 352 formed in the frame 348. In embodiments where the crossbar 304 or the aperture 352 is omitted from the mounting element 356, the blade pin 302 may extend through the aperture 310 formed in the crossbar 304 or the aperture 352 formed in the frame 348.

The main body 308 may further extend through an aperture 318 formed in a shim 316. The aperture 318 formed in the shim 316 may align with the aperture 310 of the crossbar 304. The shim 316 may be located on a second side 314 of the crossbar 304 and may abut the second side 314. The blade pin 302 may affix the shim 316 to the crossbar 304 when a fastener is affixed to the main body 308 of the blade pin 302 on an opposite side of the shim 316 from the crossbar 304 (as described further throughout this disclosure). In some embodiments, the shim 316 may be omitted and, when the fastener is affixed to the main body 308 of the blade pin 302, the fastener may abut the second side 314 of the crossbar 304.

The main body 308 may further extend through an aperture 354 formed in a blade 350. The aperture 354 formed in the blade 350 may align with the aperture 352 formed in the frame 348. The head 306 of the blade pin 302 may abut a side of the blade 350 opposite to the frame 348. The head 306 may be wider than the aperture 354 such that the head 306 may not pass through the aperture 354. The main body 308 may be narrower than the aperture 354 such that the main body 308 may extend through the aperture 354. Further, the width of the main body 308 may be slightly narrower (within 10 millimeters) than the width of the aperture 354 such that the main body 308 may fit snuggly within the aperture 354. When the fastener is affixed to the main body 308 of the blade pin 302, the blade pin 302 may affix the blade 350 to the mounting element 356.

The main body 308 may include a cavity 320 formed within the main body 308. The cavity 320 may extend between a valve 322 located at a first aperture 324 formed in a first end 328 of the main body 308 and a second aperture 326 formed in a sidewall 330 of the blade pin 302. The valve 322 may include one or more of the features of the valve 116 (FIG. 1), the first aperture 324 may include one or more of the features of the aperture where the valve 116 is located (as described in FIG. 1), and the second aperture 326 may include one or more of the features of the aperture 114 (FIG. 1). The cavity 320 may receive a lubricant passed through the valve 322 into the cavity 320 and may allow passage of the lubricant out of the second aperture 326. The lubricant that passes out of the second aperture 326 may enter a groove 332 formed in an inner wall 334 of the crossbar 304, wherein the groove 332 disperses the lubricant within the aperture 310 of the crossbar 304.

In some embodiments, the cavity 320 may further store the lubricant within the cavity 320 until a certain condition occurs that causes the lubricant to be passed out of the second aperture 326 (such as a centrifugal force causing the lubricant to be passed out of the second aperture 326). In the illustrated example, the cavity 320 may be L-shaped with a first portion of the cavity 320 extending along a length of the main body 308 and a second portion of the cavity 320 extending perpendicular to the first portion, wherein the first portion is connected to the first aperture 324 and the second portion is connected to the second aperture 326. In other embodiments, the shape of the cavity 320 may be different than the illustrated example, wherein the different shapes of the cavity 320 may be connected to the first aperture 324 and the second aperture 326.

When the blade pin 302 is installed within the mounting element 356, the second aperture 326 of the blade pin 302 formed in the sidewall 330 may align with the groove 332 formed in the inner wall 334 of the crossbar 304. The groove 332 may include one or more of the features of the groove 206 (FIG. 2), and the inner wall 334 may include one or more of the features of the inner wall 204 (FIG. 2). In particular, an upper edge 336 of the second aperture 326 may be aligned with an upper edge 340 of the groove 332, and a lower edge 338 of the second aperture 326 may be aligned with a lower edge 342 of the groove 332. In some embodiments, a portion of the second aperture 326 may align with groove 332, such that the upper edge 336 of the second aperture 326 is between the upper edge 340 and the lower edge 342 of the groove 332, while the lower edge 338 of the second aperture 326 is not aligned with the groove 332, or the lower edge 338 is between the upper edge 340 and the lower edge 342 while the upper edge 336 is not aligned with the groove 332.

The main body 308 of the blade pin 302 may further include a groove 344 formed in the sidewall 330. The groove 344 may include one or more of the features of the groove 112 (FIG. 1). When the blade pin 302 is installed within the mounting element 356 and the shim 316, the groove 344 may be located on an opposite side of the shim 316 from the crossbar 304. A lower edge 346 of the groove 344 may be aligned with the opposite side of the shim 316 from the side of the shim 316 that abuts the crossbar 304. A fastener (such as a blade pin lock clip and keyhole plate, a lock pin, and/or a retention screw and clip) may couple to the groove 344 and may maintain the blade pin 302 installed within the mounting element 356 and the shim 316. In embodiments where the shim 316 is omitted, the lower edge of the groove 344 may be aligned with the second side 314 of the crossbar 304.

The shim 316 and the blade 350 may be coupled to the mounting element 356 by the blade pin 302. The head 306 of the blade pin 302 may maintain a position of, and/or apply pressure to, the blade 350, and the fastener may maintain a position of, and/or apply pressure to, the shim 316 causing the shim 316 and the blade 350 to be coupled to the mounting element 356. In embodiments where the shim 316 is omitted, the fastener may apply pressure to the crossbar 304 causing the blade 350 to be coupled to the mounting element 356.

In other embodiments, the lower edge 346 of the groove 344 may be located further from the crossbar 304 than the opposite side of the shim 316 from the crossbar 304. In some of these embodiments, one or more shims (not shown; see the shims 1304 (FIG. 13) for an example of an embodiment of the shims) may be located between the fastener coupled to the groove 344 and the shim 316 and/or between the head 306 and the crossbar 304 to maintain the shim 316 and the blade 350 to be coupled to the mounting element 356. In other of these embodiments, the fastener may extend from the groove 344 to contact the shim 316 and cause the shim 316 and the blade 350 to be coupled to the mounting element 356.

In some embodiments, the groove 344 may be omitted. In these embodiments, the fastener may couple to the sidewall 330 rather than the groove 344 and may maintain a position of, and/or apply pressure to, the shim 316, or the crossbar 304 in embodiments where the shim 316 is omitted.

Figure 4:
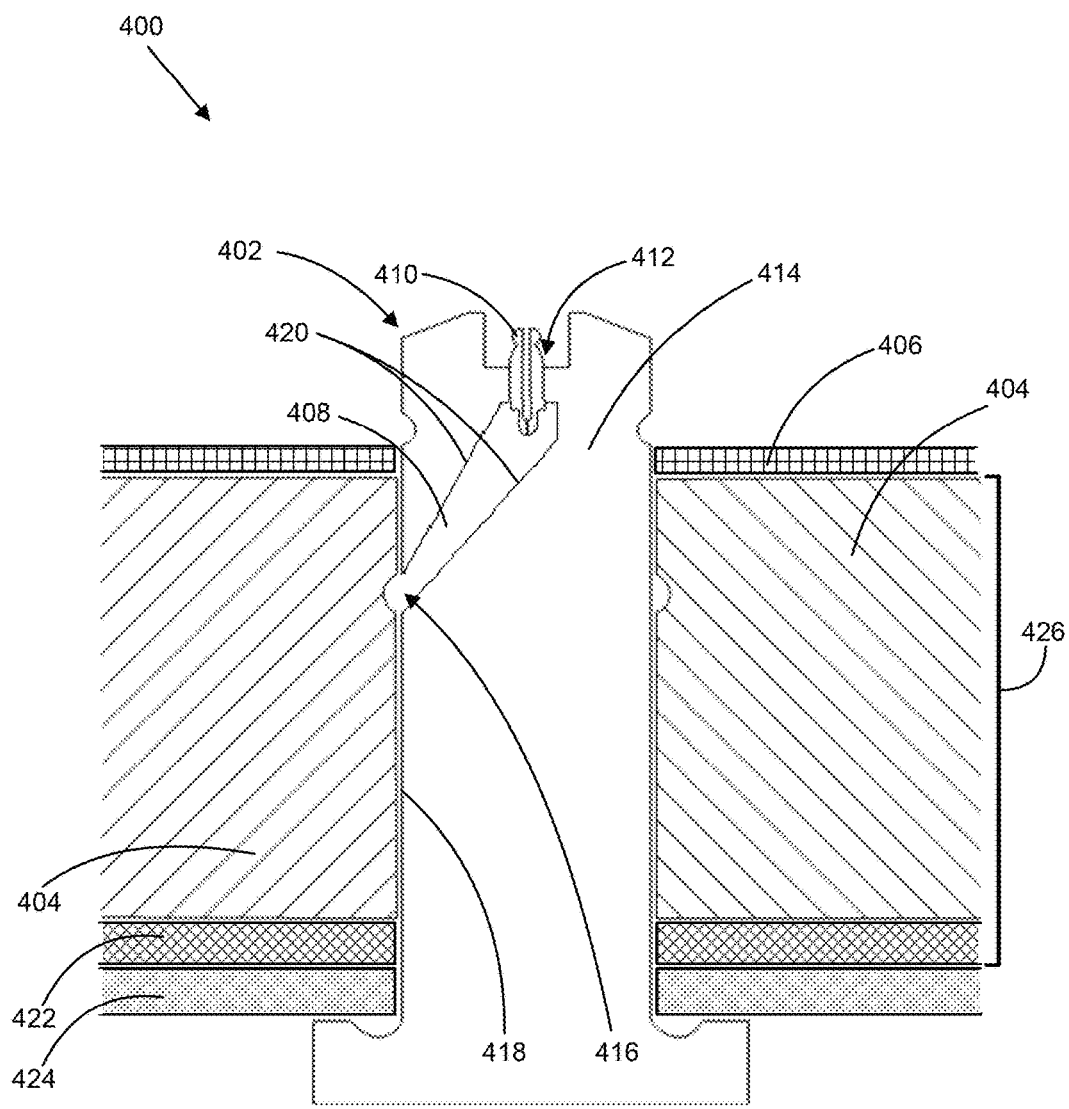
FIG. 4 illustrates a cross-sectional view of another example arrangement of a blade pin installed within a mounting element, according to various embodiments.

FIG. 4 illustrates a cross-sectional view of another example arrangement 400 of a blade pin 402 installed within a mounting element 426, according to various embodiments. The arrangement 400 may include one or more of the features of the arrangement 300 (FIG. 3), with exception of the differing features described in relation to the arrangement 400. In particular, the blade pin 402 may include one or more of the features of the blade pin 302 (FIG. 3). The mounting element 426 may include one or more of the features of the mounting element 356 (FIG. 3), including that crossbar 404 may include one or more of the features of the crossbar 304 (FIG. 3), and frame 422 may include one or more of the features of the frame 348 (FIG. 3). Further, the blade pin 402 may affix a blade 424 and/or a shim 406 to the mounting element 426, such as the blade 350 (FIG. 3) and/or the shim 316 (FIG. 3) are affixed to the mounting element 356 via the blade pin 302 in the arrangement 300.

The blade pin 402 may include a cavity 408 that extends from a valve 410 located at a first aperture 412 (formed in a center of an end of a main body 414 of the blade pin 402) and may extend toward a second aperture 416 formed in a sidewall 418 (that extends along the circumference of the main body 414) of the blade pin 402. The cavity 408 may include slanted walls 420 that slant from the first aperture 412 toward the second aperture 416. In embodiments where the arrangement 400 is part of a rotary cutting element, the arrangement 400 may be rotated about an axis and a centrifugal force generated by the rotation may cause lubrication within the cavity 408 to be forced outwards against the slanted walls 420 and toward the second aperture 416.

Figure 5:
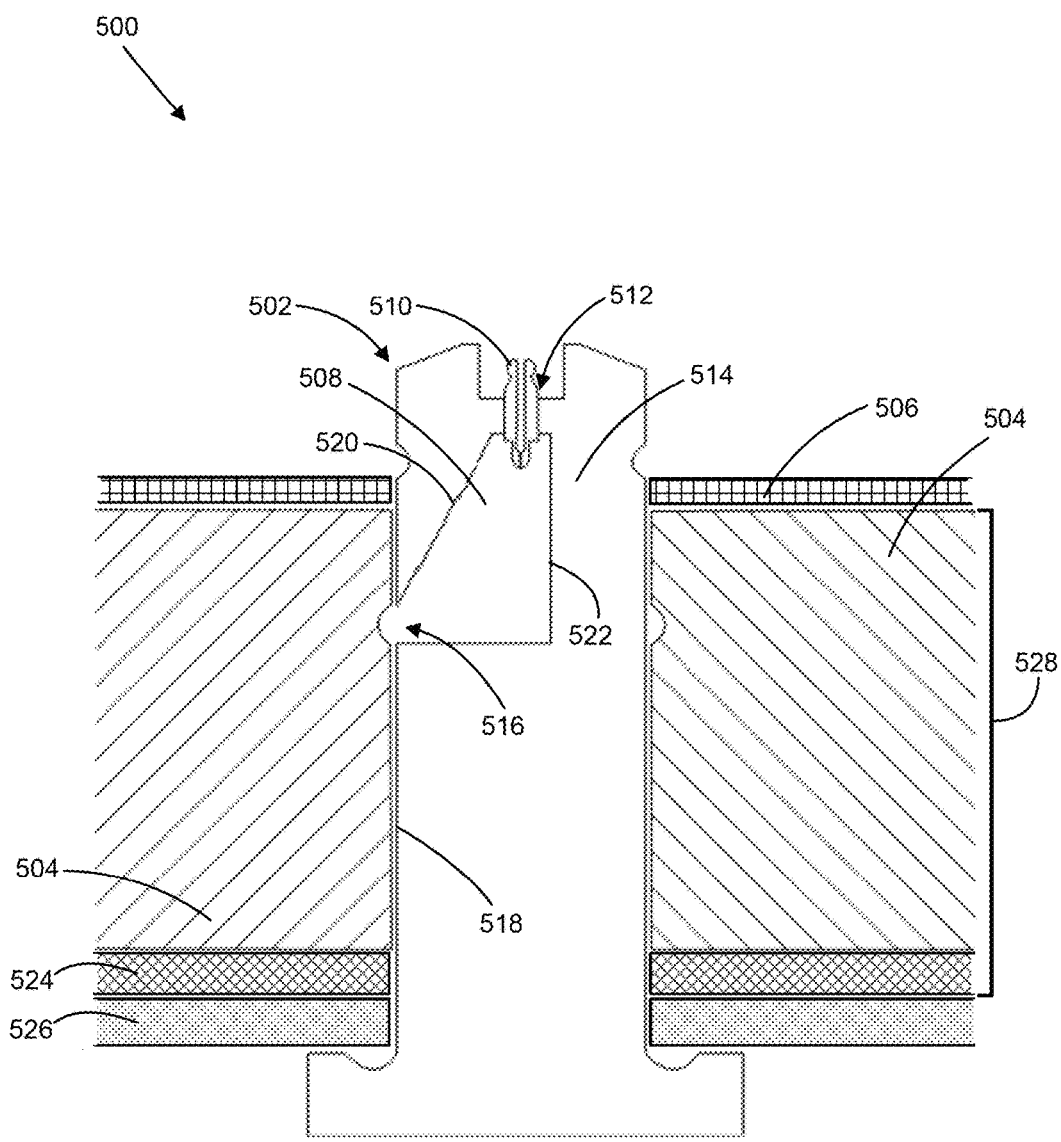
FIG. 5 illustrates a cross-sectional view of another example arrangement of a blade pin installed within a mounting element, according to various embodiments.

FIG. 5 illustrates a cross-sectional view of another example arrangement 500 of a blade pin 502 installed within a mounting element 528, according to various embodiments. The arrangement 500 may include one or more of the features of the arrangement 300 (FIG. 3), with exception of the differing features described in relation to the arrangement 500. In particular, the blade pin 502 may include one or more of the features of the blade pin 302 (FIG. 3). The mounting element 528 may include one or more of the features of the mounting element 356 (FIG. 3), including that the crossbar 504 may include one or more of the features of the crossbar 304 (FIG. 3), and the frame 524 may include one or more of the features of the frame 348 (FIG. 3). Further, the blade pin 502 may affix a blade 526 and/or a shim 506 to the mounting element 528, such as the blade 350 (FIG. 3) and/or the shim 316 (FIG. 3) are affixed to the mounting element 356 via the blade pin 302 in the arrangement 300.

The blade pin 502 may include a cavity 508 that extends from a valve 510 located at a first aperture 512 (formed in a center of an end of a main body 514 of the blade pin 502) and may extend toward a second aperture 516 formed in a sidewall 518 (that extends along the circumference of the main body 514) of the blade pin 502. The cavity 508 may include a slanted wall 520 and a straight wall 522. The slanted wall 520 may slant from the first aperture 512 toward the second aperture 516. The cavity 508 may widen as the cavity 508 extends from the first aperture 512 toward the second aperture 516. In embodiments where the arrangement 500 is part of a rotary cutting element, the arrangement 500 may be rotated about an axis and a centrifugal force generated by the rotation may cause lubrication within the cavity 508 to be forced outwards against the slanted wall 520 and toward the second aperture 516.

Figure 6:
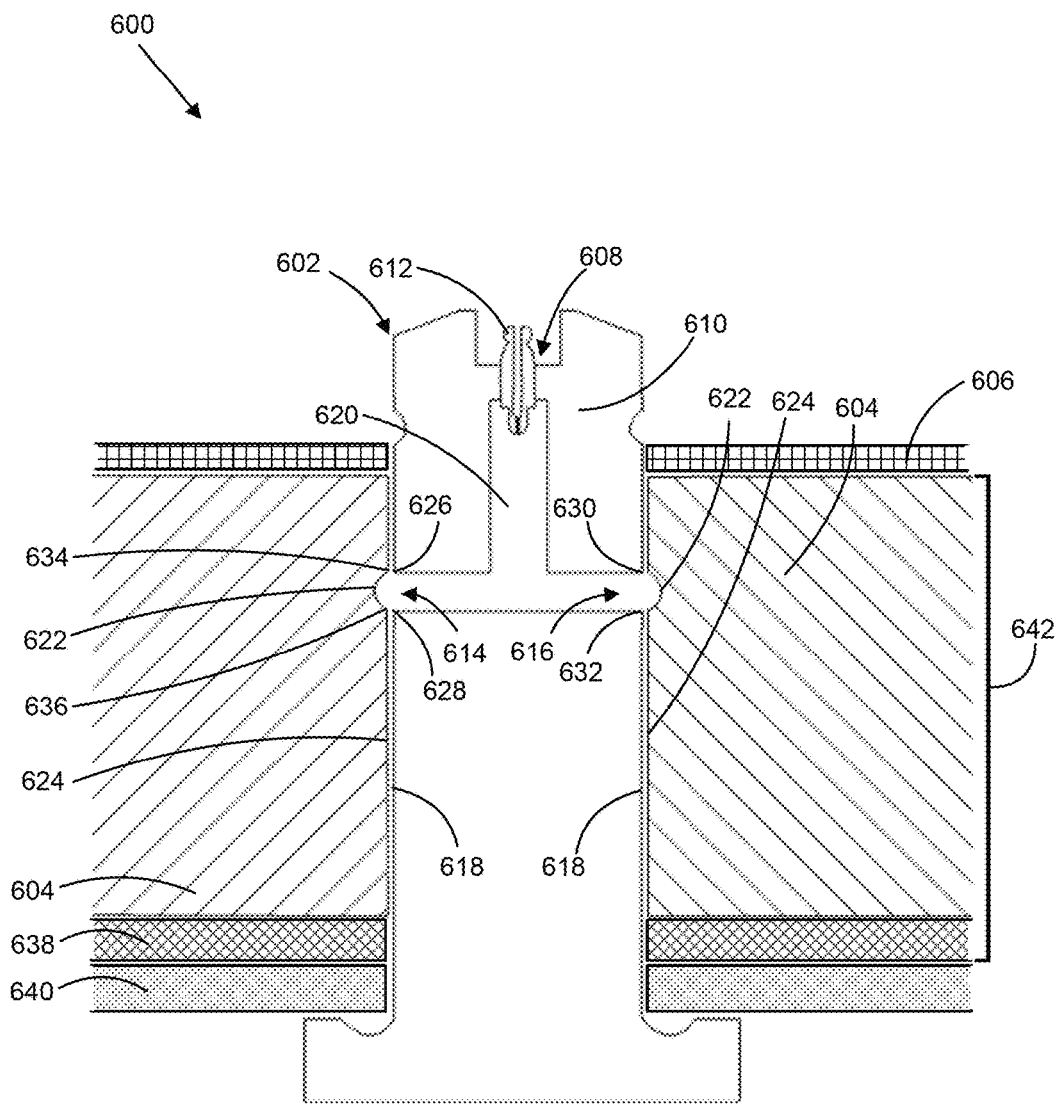
FIG. 6 illustrates a cross-sectional view of another example arrangement of a blade pin installed within a mounting element, according to various embodiments.

FIG. 6 illustrates a cross-sectional view of another example arrangement 600 of a blade pin 602 installed within a mounting element 642, according to various embodiments. The arrangement 600 may include one or more of the features of the arrangement 300 (FIG. 3), with exception of the differing features described in relation to the arrangement 600. In particular, the blade pin 602 may include one or more of the features of the blade pin 302 (FIG. 3). The mounting element 642 may include one or more of the features of the mounting element 356 (FIG. 3), including that the crossbar 604 may include one or more of the features of the crossbar 304 (FIG. 3), and the frame 638 may include one or more of the features of the frame 348 (FIG. 3). Further, the blade pin 602 may affix a blade 640 and/or a shim 606 to the mounting element 642, such as the blade 350 (FIG. 3) and/or the shim 316 (FIG. 3) are affixed to the mounting element 356 via the blade pin 302 in the arrangement 300.

The blade pin 602 may include a first aperture 608 (at which a valve 612 may be located) formed in an end of the main body 610 of the blade pin 602, a second aperture 614 formed in a sidewall 618 of the blade pin 602, and a third aperture 616 formed in the sidewall 618. The second aperture 614 may be formed in the sidewall 618 opposite to the third aperture 616. In particular, the second aperture 614 may be located directly opposite to the third aperture 616 within the main body 610 of the blade pin 602. In the illustrated example, the main body 610 may have a circular profile, where the main body 610 has a single sidewall 618 (i.e., the sidewall 618 being the outside of the circular profile). In other embodiments, the main body 610 may have a non-circular profile and the second aperture 614 may be formed in a different sidewall opposite to the sidewall in which the third aperture 616 is formed.

The blade pin 602 may include a cavity 620 formed within the blade pin 602. The cavity 620 may extend among the first aperture 608, the second aperture 614, and the third aperture 616, and may be connected to the first aperture 608, the second aperture 614, and the third aperture 616. The cavity 620 may be T-shaped with a first portion of the cavity 620 extending along a length of the main body 610 and a second portion of the cavity 620 extending perpendicular to the first portion, wherein the first portion is connected to the first aperture 608 and the second portion is connected to the second aperture 614 and the third aperture 616. The cavity 620 may receive a lubricant passed through the valve 612 into the cavity 620 and may allow passage of the lubricant out of the second aperture 614 and/or the third aperture 616. In some embodiments, the cavity 620 may further store the lubricant within the cavity 620 until a certain condition occurs that causes the lubricant to be passed out of the second aperture 614 and/or the third aperture 616 (such as a centrifugal force causing the lubricant to be passed out of the second aperture 614 and/or the third aperture 616). In other embodiments, the shape of the cavity 620 may be different than the illustrated example, wherein the different shapes of the cavity 620 may be connected to the first aperture 608, the second aperture 614, and the third aperture 616.

When the blade pin 602 is installed within the mounting element 642, the second aperture 614 of the blade pin 602 formed in the sidewall 618 may align with a groove 622 formed in an inner wall 624 of the crossbar 604. Further, the third aperture 616 may align with the groove 622 opposite to where the second aperture 614 aligns with the groove 622. The groove 622 may include one or more of the features of the groove 206 (FIG. 2), and the inner wall 624 may include one or more of the features of the inner wall 204 (FIG. 2).

In particular, an upper edge 626 of the second aperture 614 and an upper edge 630 of the third aperture 616 may be aligned with an upper edge 634 of the groove 622, and a lower edge 628 of the second aperture 614 and a lower edge 632 of the third aperture 616 may be aligned with a lower edge 636 of the groove 622. In some embodiments, a portion of the second aperture 614 and a portion of the third aperture 616 may align with groove 622, such that the upper edge 626 of the second aperture 614 and the upper edge 630 of the third aperture 616 are between the upper edge 634 and the lower edge 636 of the groove 622, while the lower edge 628 of the second aperture 614 and the lower edge 632 of the third aperture 616 are not aligned with the groove 622, or the lower edge 628 and the lower edge 632 are between the upper edge 634 and the lower edge 636, while the upper edge 626 and the upper edge 630 are not aligned with the groove 622.

Figure 7:
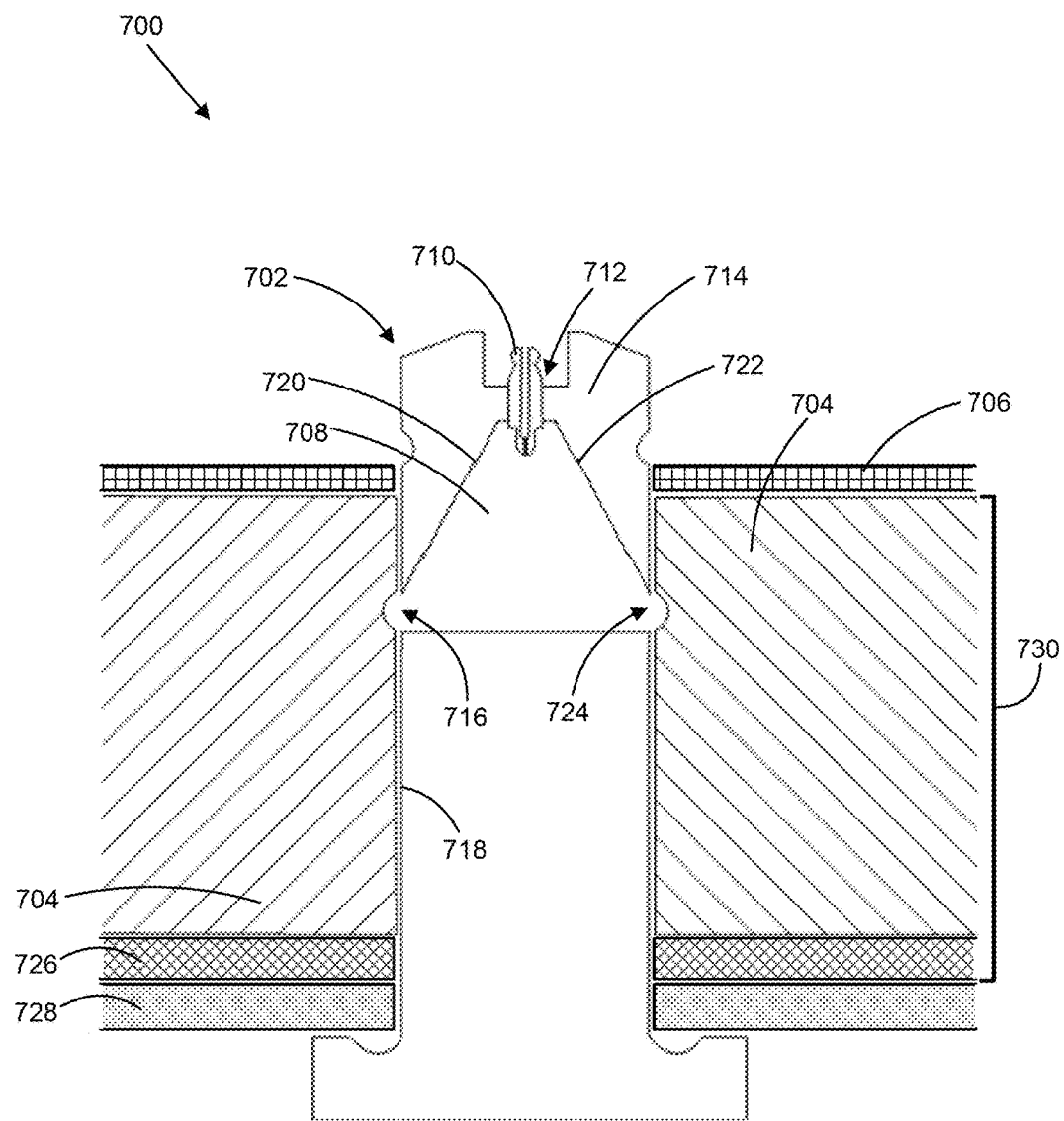
FIG. 7 illustrates a cross-sectional view of another example arrangement of a blade pin installed within a mounting element, according to various embodiments.

FIG. 7 illustrates a cross-sectional view of another example arrangement 700 of a blade pin 702 installed within a mounting element 730, according to various embodiments. The arrangement 700 may include one or more of the features of the arrangement 600 (FIG. 6), with exception of the differing features described in relation to the arrangement 700. In particular, the blade pin 702 may include one or more of the features of the blade pin 602 (FIG. 6). The mounting element 730 may include one or more of the features of the mounting element 642, including that crossbar 704 may include one or more of the features of the crossbar 604 (FIG. 6), and frame 726 may include one or more of the features of the frame 638 (FIG. 6). Further, the blade pin 702 may affix a blade 728 and/or a shim 706 to the mounting element 730, such as the blade 350 (FIG. 3) and/or the shim 316 (FIG. 3) are affixed to the mounting element 356 (FIG. 3) via the blade pin 302 in the arrangement 300 (FIG. 3).

The blade pin 702 may include a cavity 708 that extends from a valve 710 located at a first aperture 712 (formed in a center of an end of a main body 714 of the blade pin 702) and may extend toward a second aperture 716 formed in a sidewall 718 (that extends along the circumference of the main body 714) of the blade pin 702 and toward a third aperture 724 formed in the sidewall 718. The cavity 708 may include a first slanted wall 720 and a second slanted wall 722. The first slanted wall 720 may slant from the first aperture 712 toward the second aperture 716, and the second slanted wall 722 may slant from the first aperture 712 toward the third aperture 724. The cavity 708 may widen as the cavity 708 extends from the first aperture 712 toward the second aperture 716 and the third aperture 724. In embodiments where the arrangement 700 is part of a rotary cutting element, the arrangement 700 may be rotated about an axis and a centrifugal force generated by the rotation may cause lubrication within the cavity 708 to be forced outwards against the first slanted wall 720 and toward the second aperture 716, and/or forced outward against the second slanted wall 722 and toward the third aperture 724.

Figure 8:
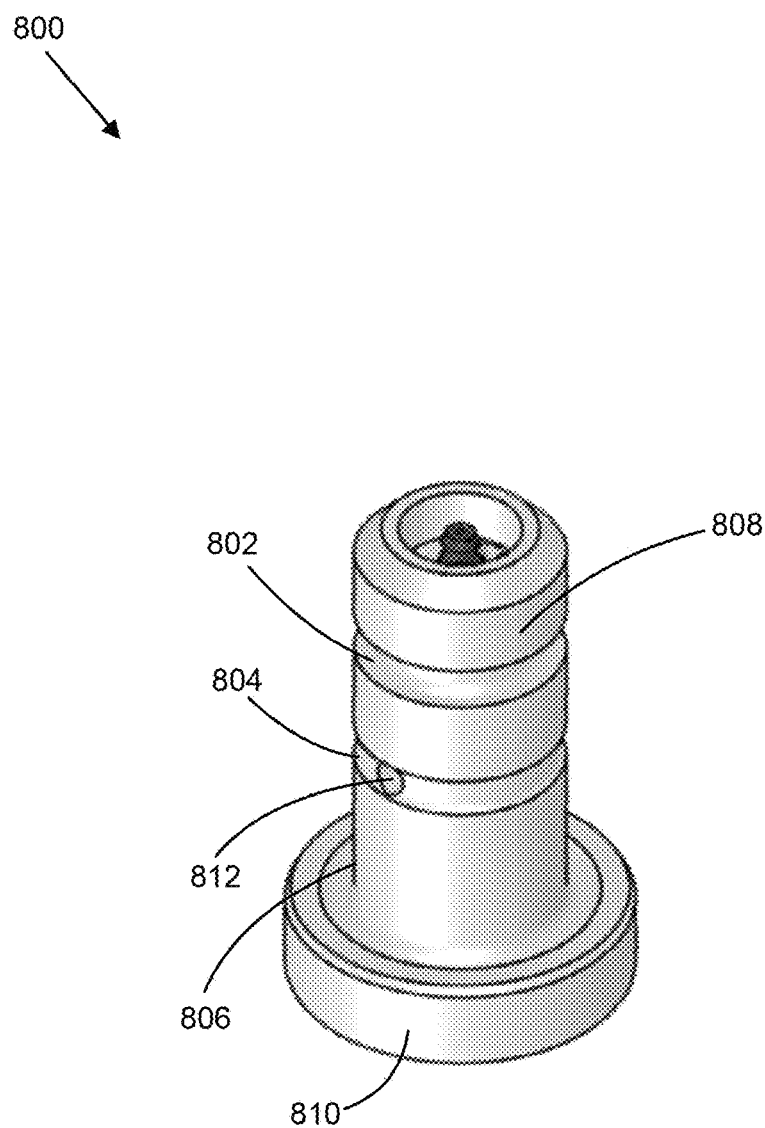
FIG. 8 illustrates another example blade pin, according to various embodiments.

FIG. 8 illustrates another example blade pin 800, according to various embodiments. The blade pin 800 may include one or more of the features of the blade pin 100 (FIG. 1), with exception of the differing features described in relation to the blade pin 800.

The blade pin 800 may include a first groove 802 and a second groove 804 formed in a sidewall 806 of a main body 808 of the blade pin 800. The first groove 802 may include one or more of the features of the groove 112 (FIG. 1). The second groove 804 may be located between the first groove 802 and a head 810 of the blade pin 800. The second groove 804 may be recessed into the main body 808 from the sidewall 806. The second groove 804 may extend around an entirety of the circumference of the main body 808 or around some portion of the circumference of the main body 808.

The blade pin 800 may further include an aperture 812. The aperture 812 may include one or more of the features of the aperture 114 (FIG. 1). The aperture 812 may be formed in the second groove 804 and may be connected to a cavity (not shown; see the cavity 910 (FIG. 9) and/or the cavity 1010 (FIG. 10) for examples of embodiments of the cavity) formed within the main body 808.

Figure 9:
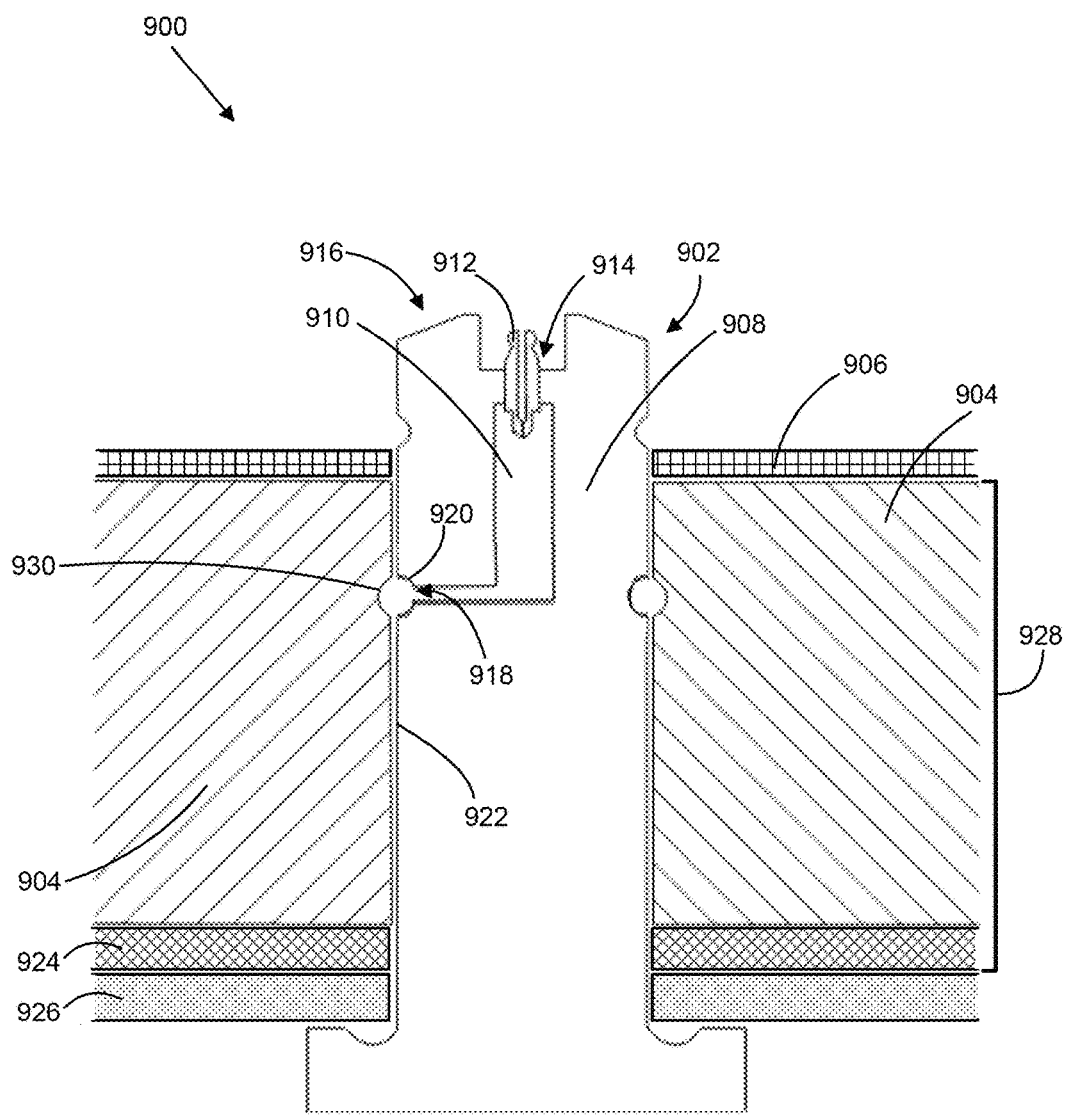
FIG. 9 illustrates a cross-sectional view of another example arrangement of a blade pin installed within a mounting element, according to various embodiments.

FIG. 9 illustrates a cross-sectional view of another example arrangement 900 of a blade pin 902 installed within a mounting element 928, according to various embodiments. The arrangement 900 may include one or more of the features of the arrangement 300 (FIG. 3), with exception of the differing features described in relation to the arrangement 900. In particular, the blade pin 902 may include one or more of the features of the blade pin 302 (FIG. 3). The mounting element 928 may include one or more of the features of the mounting element 356 (FIG. 3), including that crossbar 904 may include one or more of the features of the crossbar 304 (FIG. 3), and frame 924 may include one or more of the features of the frame 348 (FIG. 3). Further, the blade pin 902 may affix a blade 926 and/or a shim 906 to the mounting element 928, such as the blade 350 (FIG. 3) and/or the shim 316 (FIG. 3) are affixed to the mounting element 356 via the blade pin 302 in the arrangement 300.

A main body 908 of the blade pin 902 may include a cavity 910 formed within the main body 908. The cavity 910 may extend between a valve 912 located at a first aperture 914 formed within a first end 916 of the main body 908 and a second aperture 918 formed in a groove 920 of the blade pin 902. The groove 920 may be formed in a sidewall 922 of the blade pin 902. The second aperture 918 may include one or more of the features of the aperture 812 (FIG. 8), and the groove 920 may include one or more of the features of the second groove 804 (FIG. 8). The groove 920 of the blade pin 902 may align with a groove 930 formed in the crossbar 904. The groove 930 may include one or more of the features of the groove 332 (FIG. 3).

The cavity 910 may receive a lubricant passed through the valve 912 into the cavity 910 and may allow passage of the lubricant out of the second aperture 918. In some embodiments, the cavity 910 may further store the lubricant within the cavity 910 until a certain condition occurs that causes the lubricant to be passed out of the second aperture 918 (such as a centrifugal force causing the lubricant to be passed out of the second aperture 918). In the illustrated example, the cavity 910 may be L-shaped with a first portion of the cavity 910 extending along a length of the main body 908 and a second portion of the cavity 910 extending perpendicular to the first portion, wherein the first portion is connected to the first aperture 914 and the second portion is connected to the second aperture 918.

In other embodiments, the shape of the cavity 910 may be different than the illustrated example, wherein the different shapes of the cavity 910 may be connected to the first aperture 914 and the second aperture 918. For example, the cavity 910 be substantially similar (the difference due to the cavity 910 being connected to the second aperture 918 formed in the groove 920 rather than at an aperture formed in a sidewall) to the cavity 408 (FIG. 4) and/or the cavity 508 (FIG. 5).

Figure 10:
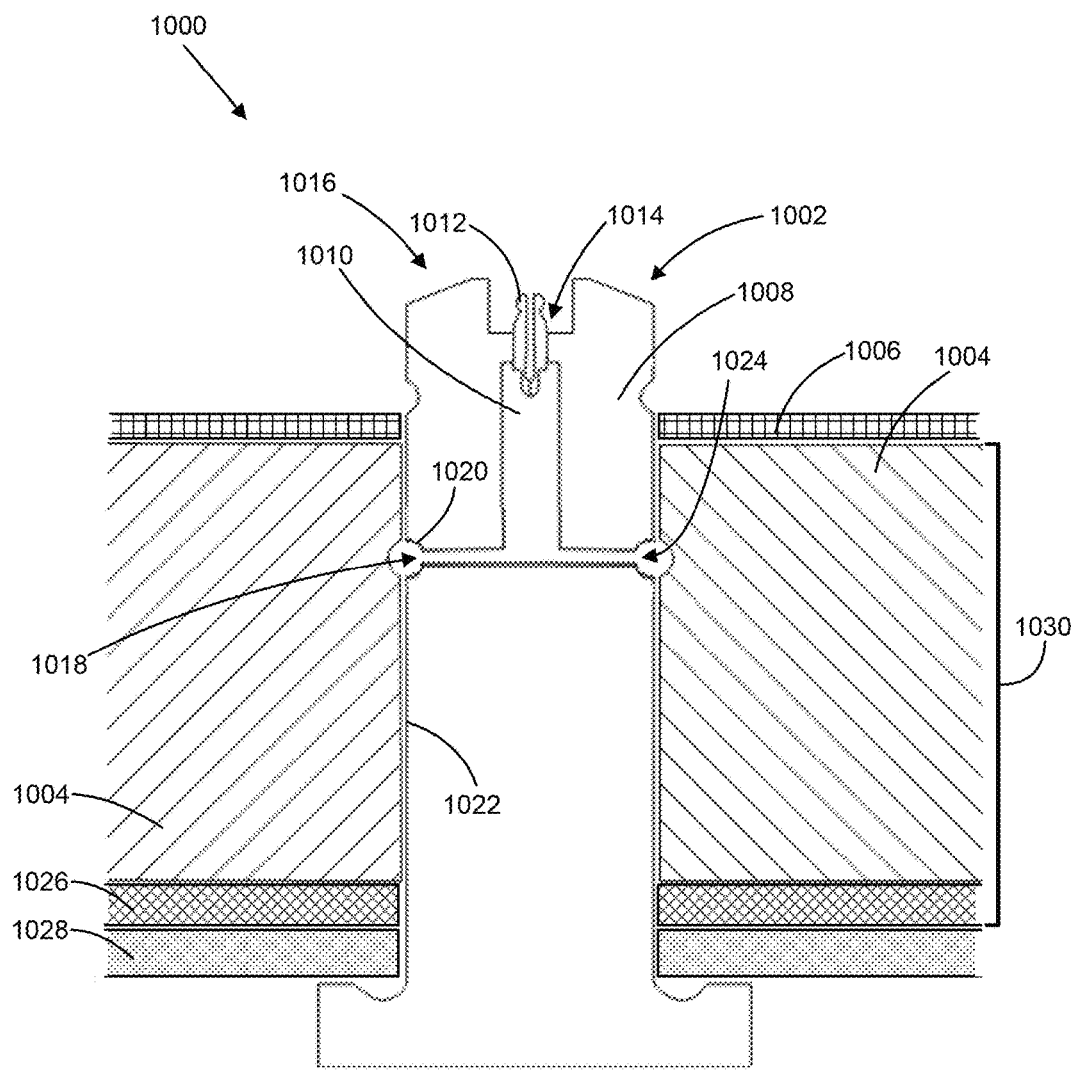
FIG. 10 illustrates a cross-sectional view of another example arrangement of a blade pin installed within a mounting element, according to various embodiments.

FIG. 10 illustrates a cross-sectional view of another example arrangement 1000 of a blade pin 1002 installed within a mounting element 1030, according to various embodiments. The arrangement 1000 may include one or more of the features of the arrangement 600 (FIG. 6), with exception of the differing features described in relation to the arrangement 1000. In particular, the blade pin 1002 may include one or more of the features of the blade pin 602 (FIG. 6). The mounting element 1030 may include one or more of the features of the mounting element 642 (FIG. 6), including that crossbar 1004 may include one or more of the features of the crossbar 604 (FIG. 6), and frame 1026 may include one or more of the features of the frame 638 (FIG. 6). Further, the blade pin 1002 may affix a blade 1028 and/or a shim 1006 to the mounting element 1030, such as the blade 640 (FIG. 6) and/or the shim 606 (FIG. 6) are affixed to the mounting element 642 via the blade pin 602 in the arrangement 600.

A main body 1008 of the blade pin 1002 may include a cavity 1010 formed within the main body 1008. The cavity 1010 may extend among a valve 1012 located at a first aperture 1014 formed within a first end 1016 of the main body 1008, a second aperture 1018 formed in a groove 1020 of the blade pin 1002, and a third aperture 1024 formed in the groove 1020. The groove 1020 may be formed in a sidewall 1022 of the blade pin 1002. The second aperture 1018 and/or the third aperture 1024 may include one or more of the features of the aperture 812 (FIG. 8), and the groove 1020 may include one or more of the features of the second groove 804 (FIG. 8). The cavity 1010 may receive a lubricant passed through the valve 1012 into the cavity 1010 and may allow passage of the lubricant out of the second aperture 1018 and/or the third aperture 1024. In some embodiments, the cavity 1010 may further store the lubricant within the cavity 1010 until a certain condition occurs that causes the lubricant to be passed out of the second aperture 1018 and/or the third aperture 1024 (such as a centrifugal force causing the lubricant to be passed out of the second aperture 1018 and/or third aperture 1024). In the illustrated example, the cavity 1010 may be T-shaped with a first portion of the cavity 1010 extending along a length of the main body 1008 and a second portion of the cavity 1010 extending perpendicular to the first portion, wherein the first portion is connected to the first aperture 1014 and the second portion is connected to the second aperture 1018 and the third aperture 1024.

In other embodiments, the shape of the cavity 1010 may be different than the illustrated example, wherein the different shapes of the cavity 1010 may be connected to the first aperture 1014 and the second aperture 1018. For example, the cavity 1010 be substantially similar (the difference due to the cavity 1010 being connected to the second aperture 1018 and the third aperture 1024 formed in the groove 1020 rather than at apertures formed in a sidewall 1022) to the cavity 708 (FIG. 7).

Figure 11:
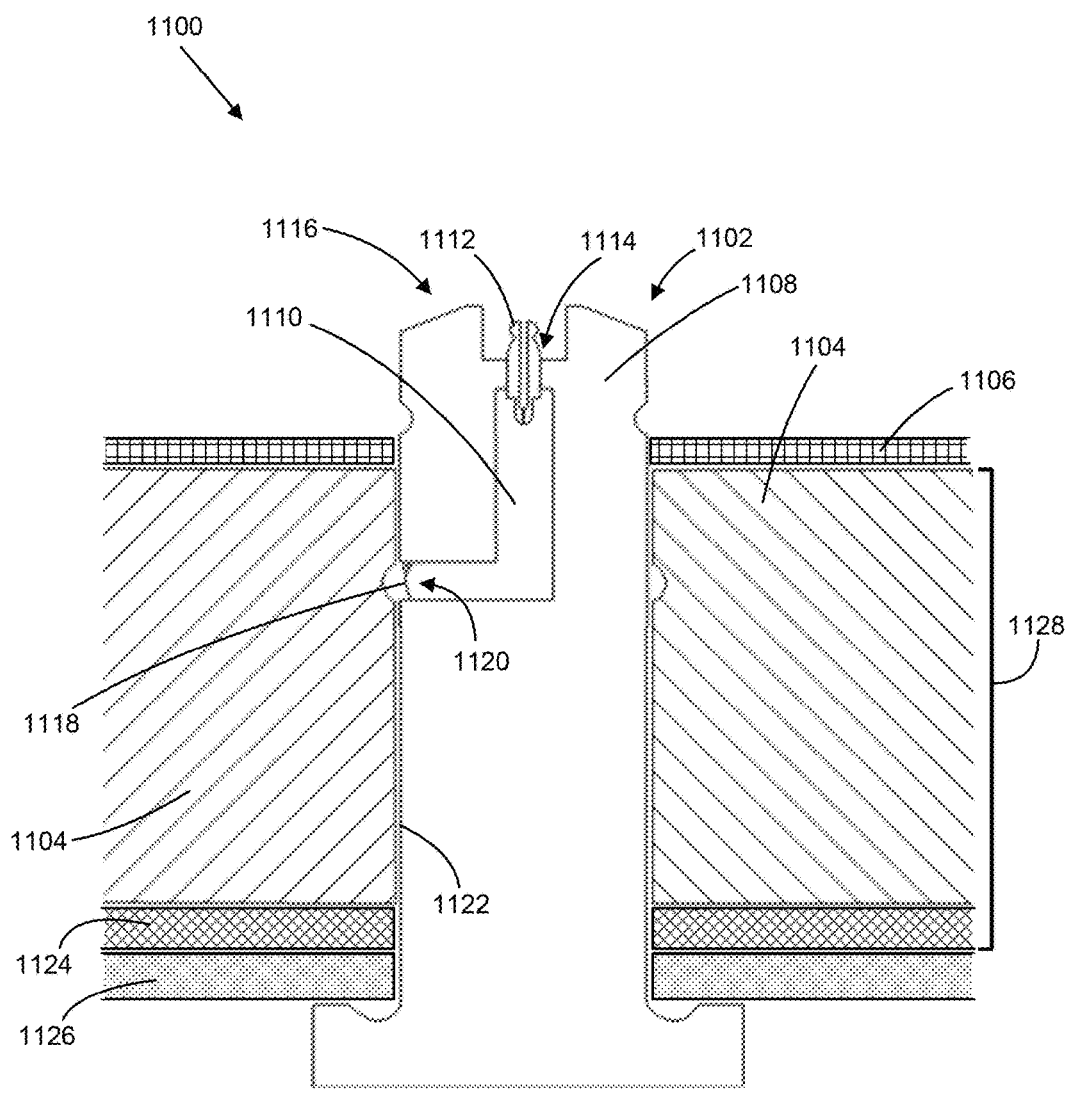
FIG. 11 illustrates a cross-sectional view of another example arrangement of a blade pin installed within a mounting element, according to various embodiments.

FIG. 11 illustrates a cross-sectional view of another example arrangement 1100 of a blade pin 1102 installed within a mounting element 1128, according to various embodiments. The arrangement 1100 may include one or more of the features of the arrangement 300 (FIG. 3), with exception of the differing features described in relation to the arrangement 1100. In particular, the blade pin 1102 may include one or more of the features of the blade pin 302 (FIG. 3). The mounting element 1128 may include one or more of the features of the mounting element 356 (FIG. 3), including that crossbar 1104 may include one or more of the features of the crossbar 304 (FIG. 3), and frame 1124 may include one or more of the features of the frame 348 (FIG. 3). Further, the blade pin 1102 may affix a blade 1126 and/or a shim 1106 to the mounting element 1128, such as the blade 350 (FIG. 3) and/or the shim 316 (FIG. 3) are affixed to the mounting element 356 via the blade pin 302 in the arrangement 300.

A main body 1108 of the blade pin 1102 may include a cavity 1110 formed within the main body 1108. The cavity 1110 may extend from a first valve 1112 at a first aperture 1114 formed in a first end 1116 of the main body 1108 to a second valve 1118 at a second aperture 1120 formed in a sidewall 1122 of the main body 1108. The first valve 1112 and the second valve 1118 may be the same type and/or model of valve or may be different types and/or models of valves that provide unidirectional flow (i.e., allowing passage of lubricant in one direction and preventing passage of lubricant in the opposite direction).

The first valve 1112 may allow passage of lubricant into the cavity 1110 through the first aperture 1114 and may prevent the passage of the lubricant out of the cavity 1110 through the first aperture 1114. The second valve 1118 may allow passage of the lubricant out of the cavity 1110 through the second aperture 1120 and may prevent the passage of the lubricant into the cavity 1110 through the second aperture 1120. In some embodiments, the second valve 1118 may maintain the lubricant within the cavity 1110 until a minimum differential force is applied between the lubricant attempting to pass out of the cavity 1110 through the second aperture 1120 and the lubricant (or other materials) attempting to pass into the cavity 1110 through the second aperture 1120. When the force generated by the lubricant attempting to pass out of the cavity 1110 exceeds the force generated by the lubricant (or other materials) attempting to pass into the cavity 1110 by at least the minimum differential force, the second valve 1118 may allow the lubricant to pass out of the cavity 1110 through the second aperture 1120.

It is to be understood that the second valve 1118 may be implemented in any of the blade pins described throughout this disclosure, including the blade pin 100 (FIG. 1), the blade pin 302 (FIG. 3), the blade pin 402 (FIG. 4), the blade pin 502 (FIG. 5), the blade pin 602 (FIG. 6), the blade pin 702 (FIG. 7), the blade pin 800 (FIG. 8), the blade pin 902 (FIG. 9), and/or the blade pin 1002 (FIG. 10). In particular, the second valve 1118 may be located at the aperture 114 (FIG. 1), the second aperture 326 (FIG. 3), the second aperture 416 (FIG. 4), the second aperture 516 (FIG. 5), and/or the second aperture 918 (FIG. 9) in different embodiments. Further, one or more valves having the features of the second valve 1118 may be located at the second aperture 614 (FIG. 6) and/or the third aperture 616 (FIG. 6) in the blade pin 602 (FIG. 6), at the second aperture 716 (FIG. 7) and/or the third aperture 724 (FIG. 7) in the blade pin 702 (FIG. 7), and/or at the second aperture 1018 (FIG. 10) and/or the third aperture 1024 (FIG. 10) in the blade pin 1002 (FIG. 10).

Figure 12:
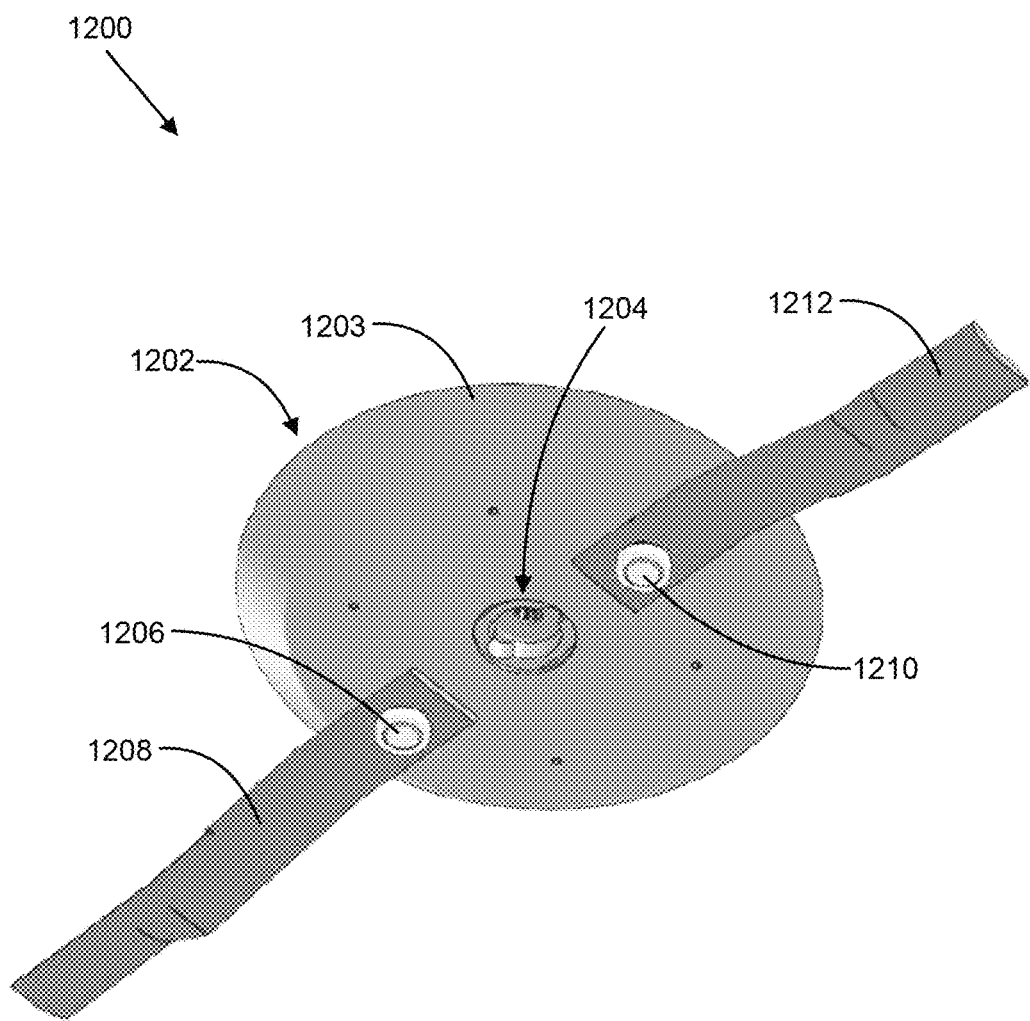
FIG. 12 illustrates an example rotary cutting element, according to various embodiments.

FIG. 12 illustrates an example rotary cutting element 1200, according to various embodiments. It is to be understood that the rotary cutting element 1200 is one example of a cutting element in which the features are described throughout this disclosure. The features may also be implemented in non-rotary cutting elements.

The rotary cutting element 1200 may include a mounting element 1202. The mounting element 1202 may be representative of the mounting elements described throughout this disclosure, including the mounting element 356 (FIG. 3), the mounting element 426 (FIG. 4), the mounting element 528 (FIG. 5), the mounting element 642 (FIG. 6), the mounting element 730 (FIG. 7), the mounting element 928 (FIG. 9), the mounting element 1030 (FIG. 10), and/or the mounting element 1128 (FIG. 11). The mounting element 1202 may include a frame 1203. The frame 1203 may have a circular profile with a shaft connection point 1204 located in a center of the frame 1203. The shaft connection point 1204 may receive a shaft of a mowing apparatus (or other apparatus that may utilize the cutting element 1200, such as a saw apparatus), wherein the shaft may cause the mounting element 1202 to be rotated about the shaft connection point 1204. In some embodiments, the frame 1203 may have a profile of a different shape, such as an oval-shaped profile, a football-shaped profile, or any other shape of profile. Further, in some embodiments, the frame 1203 may have a profile that is the shape of the crossbar 1302 (FIG. 13) or the frame 1203 may be omitted.

The mounting element 1202 may include one or more apertures (such as the aperture 310 (FIG. 3) of the crossbar 304 (FIG. 3) and/or the aperture 352 (FIG. 3) of the frame 348 (FIG. 3)) that receive blade pins to couple one or more blades to the mounting element 1202. In the illustrated example, the mounting element 1202 may include two apertures that may receive a first blade pin 1206 that couples a first blade 1208 to the mounting element 1202 and a second blade pin 1210 that couples a second blade 1212 to the mounting element 1202. A first one of the two apertures may be located on a first side of the shaft connection point 1204 and a second one of the two apertures may be located on a second side of the shaft connection point 1204 opposite to the first side.

The first blade pin 1206 and/or the second blade pin 1210 may include one or more of the features of the blade pins described throughout this disclosure, including the blade pin 100 (FIG. 1), the blade pin 302 (FIG. 3), the blade pin 402 (FIG. 4), the blade pin 502 (FIG. 5), the blade pin 602 (FIG. 6), the blade pin 702 (FIG. 7), the blade pin 800 (FIG. 8), the blade pin 902 (FIG. 9), the blade pin 1002 (FIG. 10), and/or the blade pin 1102 (FIG. 11). The first blade pin 1206 may pass through one of the apertures of the mounting element 1202 and an aperture formed in the first blade 1208 (such as the aperture 310 (FIG. 3)). A head of the first blade pin 1206 may abut the first blade 1208 on a side of the first blade 1208 opposite to the mounting element 1202 and may maintain a position of the first blade 1208 against the mounting element 1202 and/or apply pressure to the first blade 1208, thereby coupling the first blade 1208 to the mounting element 1202.

Further, the second blade pin 1210 may pass through one of the apertures of the mounting element 1202 and an aperture formed in the second blade 1212 (such as the aperture 310 (FIG. 3)). A head of the second blade pin 1210 may abut the second blade 1212 on a side of the second blade 1212 opposite to the mounting element 1202 and may maintain a position of the second blade 1212 against the mounting element 1202 and/or apply pressure to the second blade 1212, thereby coupling the second blade 1212 to the mounting element 1202.

The first blade 1208 and the second blade 1212 may include one or more of the features of the blades described throughout this disclosure, including the blade 350 (FIG. 3), the blade 424 (FIG. 4), the blade 526 (FIG. 5), the blade 640 (FIG. 6), the blade 728 (FIG. 7), the blade 926 (FIG. 9), the blade 1028 (FIG. 10), and/or the blade 1126 (FIG. 11). The first blade 1208 and the second blade 1212 may extend radially outward from the respective coupling points (the coupling points located at the first blade pin 1206 and the second blade pin 1210, respectively). Each of the first blade 1208 and the second blade 1212 may include a sharp edge, or some portion of the edge that is sharp, that may be configured to cut an object or objects (such as grass or other vegetation) as the mounting element 1202 is rotated by the shaft.

While the rotary cutting element 1200 is described as including two blades, it is to be understood that the rotary cutting element 1200 may include one or more blades (including more than two blades) in other embodiments. Further, the rotary cutting element 1200 may include one or more blade pins in other embodiments, with a one-to-one ratio of blade pins to the blades.

Figure 13:
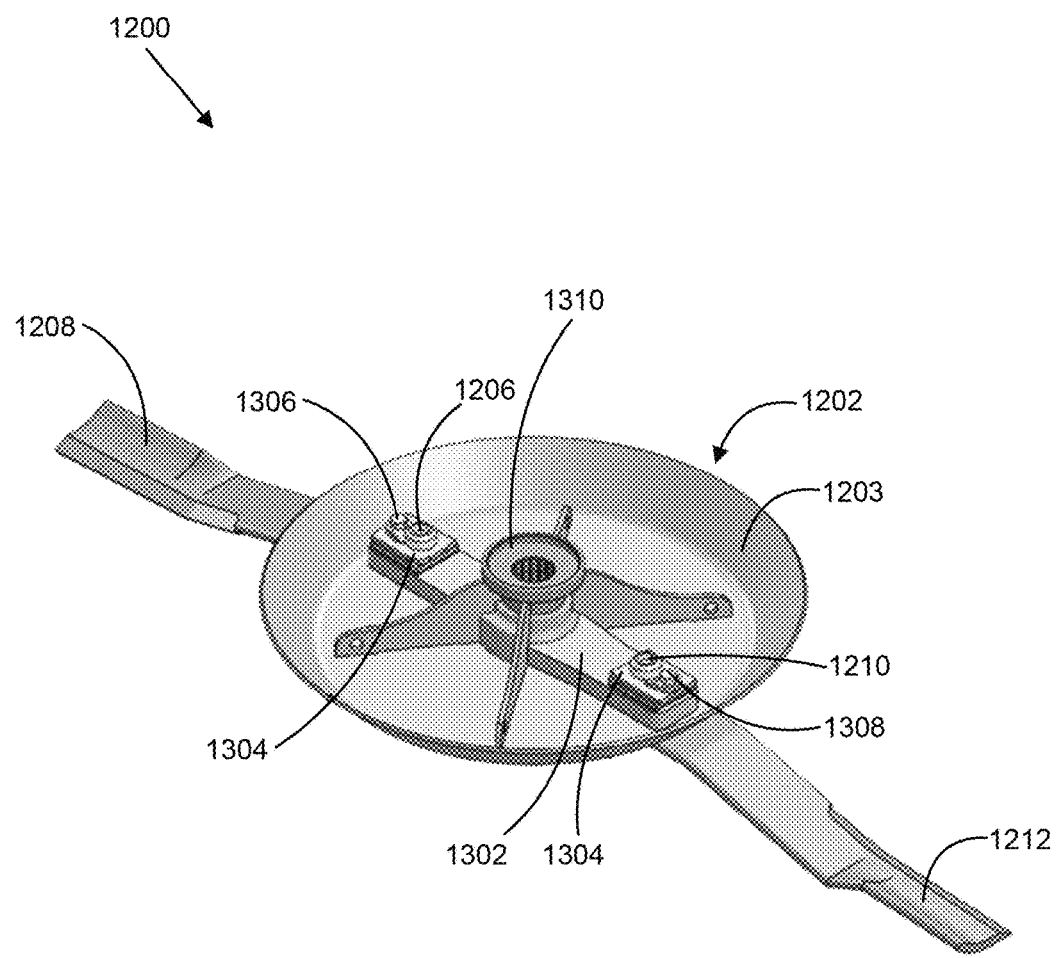
FIG. 13 illustrates another view of the example rotary cutting element of FIG. 12, according to various embodiments.

FIG. 13 illustrates another view of the example rotary cutting element 1200 of FIG. 12, according to various embodiments. The view illustrated in FIG. 13 shows an opposite side of the rotary cutting element 1200 from that illustrated in FIG. 12.

In the illustrated example, the mounting element 1202 may include a crossbar 1302. The crossbar 1302 may include one or more of the features of the crossbar 200 (FIG. 2), the crossbar 304 (FIG. 3), the crossbar 404 (FIG. 4), the crossbar 504 (FIG. 5), the crossbar 604 (FIG. 6), the crossbar 704 (FIG. 7), the crossbar 904 (FIG. 9), the crossbar 1004 (FIG. 10), and/or the crossbar 1104 (FIG. 11). The crossbar 1302 may extend along a same plane as the first blade 1208 and the second blade 1212. The first blade pin 1206 and the second blade pin 1210 may further extend through apertures formed in the crossbar 1302.

One or more shims 1304 may be placed on the crossbar 1302 and the first blade pin 1206 and the second blade pin 1210 may extend through apertures formed in the shims 1304. The shims 1304 may include one or more of the features of the shim 316 (FIG. 3), the shim 406 (FIG. 4), the shim 506 (FIG. 5), the shim 606 (FIG. 6), the shim 706 (FIG. 7), the shim 906 (FIG. 9), the shim 1006 (FIG. 10), and/or the shim 1106 (FIG. 11). The shims 1304 may allow minor adjustments to be made to the thickness of the mounting element 1202 to provide for a tight coupling of the first blade 1208 and/or the second blade 1212 to the mounting element 1202 via the first blade pin 1206 and/or the second blade pin 1210, respectively. In other embodiments, the shims 1304 may be omitted.

The cutting element 1200 may further include a first fastener 1306 and a second fastener 1308. The first fastener 1306 and the second fastener 1308 may each include a blade retention screw and a clip. In other embodiments, the first fastener 1306 and the second fastener 1308 may be any type of fastener that would be understood by one having ordinary skill in the art to be capable of maintaining a position of the first blade pin 1206 and/or the second blade pin 1210.

The first fastener 1306 may couple to the first blade pin 1206 and may maintain a position of the first blade pin 1206. In particular, the blade retention screw of the first fastener 1306 may be coupled to the mounting element 1202 and the clip of the first fastener 1306 may couple to a groove (such as the groove 112 (FIG. 1), the groove 344 (FIG. 3), and/or the first groove 802 (FIG. 8)) of the first blade pin 1206 to maintain the position of the first blade pin 1206. Further, in some embodiments, a combination of the first fastener 1306 and the first blade pin 1206 may apply pressure to the mounting element 1202 causing the first blade 1208 to be coupled to the mounting element 1202 via the first blade pin 1206.

The second fastener 1308 may couple to the second blade pin 1210 and may maintain a position of the second blade pin 1210. In particular, the blade retention screw of the second fastener 1308 may be coupled to the mounting element 1202 and the clip of the second fastener 1308 may couple to a groove (such as the groove 112 (FIG. 1), the groove 344 (FIG. 3), and/or the first groove 802 (FIG. 8)) of the second blade pin 1210 to maintain the position of the second blade pin 1210. Further, in some embodiments, a combination of the second fastener 1308 and the second blade pin 1210 may apply pressure to the mounting element 1202 causing the second blade 1212 to be coupled to the mounting element 1202 via the second blade pin 1210.

The cutting element 1200 may further include a shaft interface 1310. The shaft interface 1310 may correspond to the shaft connection point 1204 (FIG. 12). The shaft interface 1310 may receive the shaft of the mowing apparatus (or other apparatus that may utilize the cutting element 1200, such as a saw apparatus) and interface with the shaft, such that as the shaft rotates the shaft interface 1310 translates the rotation to the mounting element 1202.

Figure 14:
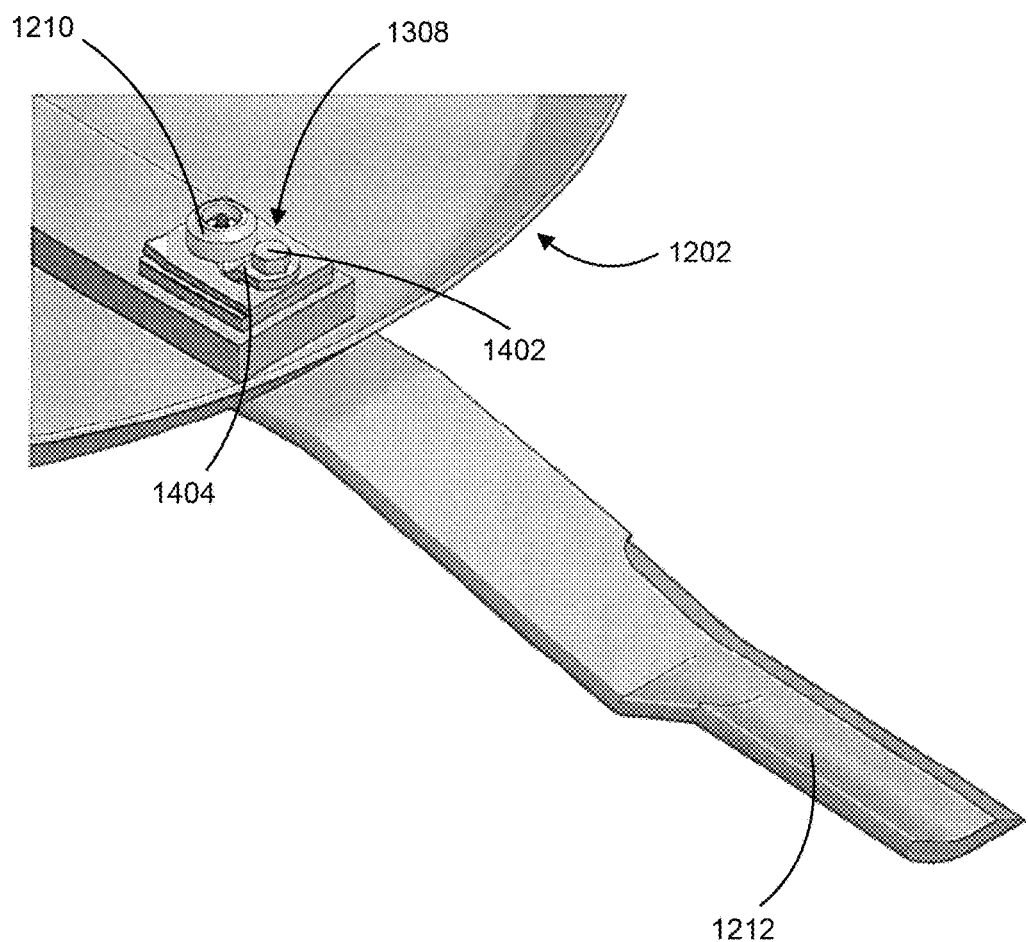
FIG. 14 illustrates an enlarged view of an example blade attachment of the rotary cutting element of FIG. 13, according to various embodiments.

FIG. 14 illustrates an enlarged view of an example blade attachment of the rotary cutting element 1200 of FIG. 13, according to various embodiments. The enlarged view may illustrate the attachment of the second blade 1212 to the mounting element 1202. As can be seen from the enlarged view, the second fastener 1308 may include a blade retention screw 1402 and a clip 1404. The blade retention screw 1402 may couple to the mounting element 1202 and the clip 1404 may couple to the second blade pin 1210, thereby maintaining a position of the second blade pin 1210 and causing the second blade 1212 to be coupled to the mounting element 1202.

Figure 15:
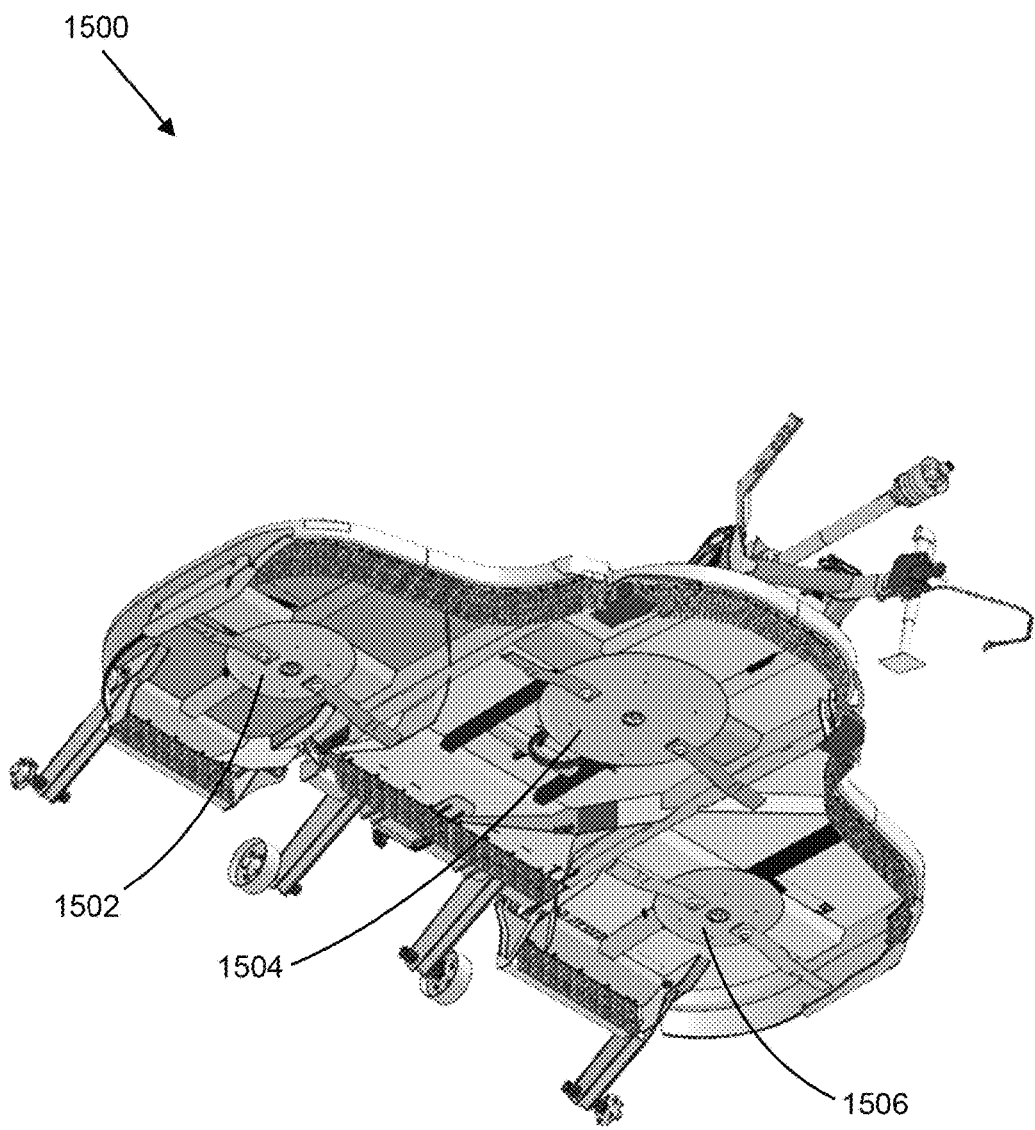
FIG. 15 illustrates an example mowing apparatus, according to various embodiments.

FIG. 15 illustrates an example mowing apparatus 1500, according to various embodiments. The mowing apparatus 1500 may include one or more rotary cutting elements. In the illustrated example, the mowing apparatus 1500 may include a first rotary cutting element 1502, a second rotary cutting element 1504, and a third rotary cutting element 1506. The first rotary cutting element 1502, the second rotary cutting element 1504, and/or the third rotary cutting element 1506 may include one or more of the features of the rotary cutting elements described throughout this disclosure, including the rotary cutting element 1200 (FIG. 12). Each of the first rotary cutting element 1502, the second rotary cutting element 1504, and the third rotary cutting element 1506 may be coupled to a corresponding shaft of the mowing apparatus 1500. The shafts may cause the first rotary cutting element 1502, the second rotary cutting element 1504, and/or the third rotary cutting element 1506 to rotate when a mowing feature of the mowing apparatus 1500 is activated. The mowing feature may be activated when the mowing apparatus 1500 is turned on, or in response to some other trigger event.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A cutting element, comprising:
a crossbar that includes:
an aperture that extends from a first side of the crossbar to a second side of the crossbar; and
an inner wall that abuts the aperture and extends from the first side of the crossbar to the second side of the crossbar along the aperture, wherein a groove is formed in the inner wall between the first side of the crossbar and the second side of the crossbar, and wherein the groove is configured to disperse a lubricant within the aperture;
a blade coupled to the crossbar; and
a blade pin that couples the blade to the crossbar and extends through the aperture of the crossbar, wherein the blade pin includes:
a cavity formed within the blade pin;
a first aperture formed in an end of the blade pin, wherein the first aperture is connected to the cavity;
a second aperture formed in a sidewall of the blade pin, wherein the second aperture is connected to the cavity, wherein the sidewall abuts the inner wall, and wherein the second aperture is aligned with the groove of the crossbar; and
a valve located at the first aperture, wherein the valve allows passage of the lubricant into the cavity through the first aperture and prevents passage of the lubricant out of the cavity through the first aperture.

2. The cutting element of claim 1, wherein the blade includes an aperture formed through the blade, wherein the aperture of the blade is aligned with the aperture of the crossbar, and wherein the blade pin extends through the aperture of the blade.

3. The cutting element of claim 1, wherein the first aperture is located at a first end of the cavity and the second aperture is located at a second end of the cavity opposite to the first end of the cavity.

4. The cutting element of claim 1, wherein the blade pin further includes a groove formed in the sidewall of the blade pin, wherein the second aperture is formed in the groove of the blade pin, and wherein the groove of the blade pin is aligned with the groove of the crossbar.

5. The cutting element of claim 1, wherein the blade pin further includes a third aperture formed in the sidewall, wherein the third aperture is located opposite to the second aperture, wherein the third aperture is connected to the cavity, and wherein the third aperture is aligned with the groove of the crossbar.

6. The cutting element of claim 1, wherein the valve is a first valve, wherein the blade pin further includes a second valve located at the second aperture, and wherein the second valve allows passage of the lubricant out of the cavity through the second aperture and prevents passage of the lubricant into the cavity through the second aperture.

7. The cutting element of claim 1, wherein the groove of the crossbar extends around an entirety of a circumference of the inner wall.

8. A mowing apparatus, comprising:
a cutting element that includes:
a crossbar that includes:
an aperture that extends from a first side of the crossbar to a second side of the crossbar; and
an inner wall that abuts the aperture and extends from the first side of the crossbar to the second side of the crossbar along the aperture, wherein a groove is formed in the inner wall between the first side of the crossbar and the second side of the crossbar, and wherein the groove is configured to disperse a lubricant within the aperture; and
a blade pin that couples a blade to the crossbar within the cutting element and extends through the aperture of the crossbar, wherein the blade pin includes:
a cavity formed within the blade pin;
a first aperture formed in an end of the blade pin, and wherein the first aperture is connected to the cavity;
a second aperture formed in a sidewall of the blade pin and configured to allow the lubricant to pass through the second aperture into the groove of the crossbar, wherein the sidewall abuts the inner wall, wherein the second aperture is connected to the cavity, and wherein the second aperture is aligned with the groove of the crossbar; and a valve located at the first aperture, wherein the valve allows passage of the lubricant into the cavity through the first aperture and prevents passage of the lubricant out of the cavity through the first aperture.

9. The mowing apparatus of claim 8, wherein the cutting element further includes a frame coupled to the crossbar, the frame configured to rotate about a center of the frame, and wherein the blade extends outside of a circumference of the frame when the frame rotates about the center of the frame.

10. The mowing apparatus of claim 8, wherein the blade pin includes a groove formed in the sidewall of the blade pin, wherein the second aperture is formed in the groove of the blade pin, and wherein the groove of the blade pin is aligned with the groove of the crossbar.

11. The mowing apparatus of claim 8, wherein the blade pin further includes a third aperture formed in the sidewall, wherein the third aperture is located opposite to the second aperture, wherein the third aperture is connected to the cavity, and wherein the third aperture is aligned with the groove of the crossbar.

\* \* \* \* \*